(12) United States Patent
Honkala et al.

(10) Patent No.: US 6,942,050 B1
(45) Date of Patent: Sep. 13, 2005

(54) SNOWMOBILE FRONT SUSPENSION SYSTEM AND METHOD

(75) Inventors: Bruce A. Honkala, Roseau, MN (US); Jeffrey A. Eaton, Wannaska, MN (US); Guy L. Sibilleau, Roseau, MN (US); Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/834,145

(22) Filed: Apr. 28, 2004

(51) Int. Cl.[7] .......................................... B62M 27/02
(52) U.S. Cl. ..................................... 180/182; 280/21.1
(58) Field of Search ................................ 180/182, 183, 180/186, 190; 280/21.1

(56) References Cited

U.S. PATENT DOCUMENTS

| | | | |
|---|---|---|---|
| 2,245,809 A | 6/1941 | Olley | 267/274 |
| 3,147,990 A | 9/1964 | Wettstein | 280/104 |
| 3,161,419 A | 12/1964 | Schaaf | 280/124.136 |
| 3,189,118 A | 6/1965 | Arning | 180/359 |
| 3,858,901 A | 1/1975 | Johnson | 280/124.138 |
| 3,881,741 A | 5/1975 | Müller | 280/124.138 |
| 3,883,152 A | 5/1975 | de Carbon | 280/124.138 |
| 4,313,619 A | 2/1982 | Hailer | 280/124.138 |
| 4,457,537 A | 7/1984 | von derOhe et al. | 280/124.138 |
| 4,610,461 A | 9/1986 | Guzzetta | 280/124.134 |
| 4,671,521 A | 6/1987 | Talbot et al. | 280/16 |
| 4,925,207 A | 5/1990 | Haraguchi | 280/124.138 |
| 4,968,056 A | 11/1990 | Haraguchi | 280/124.138 |
| 5,000,476 A | 3/1991 | Lindorfer et al. | 280/124.107 |
| 5,029,664 A | 7/1991 | Zulawski | 180/190 |
| 5,038,882 A | 8/1991 | Zulawski | 180/190 |
| 5,074,582 A | 12/1991 | Parsons | 280/124.107 |
| 5,197,755 A | 3/1993 | Quick | 280/124.141 |
| 5,503,242 A | 4/1996 | Jeffers | 180/182 |
| 5,558,360 A | 9/1996 | Lee | 280/124.138 |
| 5,839,742 A | 11/1998 | Holt | 280/124.134 |
| 5,992,868 A | 11/1999 | Orimoto | 280/124.138 |
| 6,009,966 A | 1/2000 | Olson et al. | 180/182 |
| 6,260,648 B1 * | 7/2001 | Bessette | 180/184 |
| 6,263,994 B1 | 7/2001 | Eitel | 180/219 |
| 6,328,124 B1 * | 12/2001 | Olson et al. | 180/182 |
| 6,354,391 B1 | 3/2002 | Cormican | 180/193 |
| 6,357,543 B1 | 3/2002 | Karpik | 180/182 |
| 6,474,662 B1 | 11/2002 | Cormican | 280/21.1 |
| 6,499,551 B2 | 12/2002 | Karpik | 180/190 |
| 2002/0017765 A1 | 2/2002 | Mallette et al. | 280/28 |
| 2002/0041080 A1 * | 4/2002 | Moriyama et al. | 280/609 |
| 2002/0053477 A1 | 5/2002 | Karpik | 180/182 |
| 2002/0175013 A1 | 11/2002 | Karpik | 180/182 |
| 2002/0185829 A1 | 12/2002 | Cormican | 280/21.1 |

* cited by examiner

*Primary Examiner*—Kevin Hurley
(74) *Attorney, Agent, or Firm*—Fredrikson & Byron, P.A.

(57) ABSTRACT

The snowmobile having a longitudinal axis, a chassis, a pair of skis each having a steering spindle, and a suspension system. The suspension system comprises, for each ski, a first control arm pivotally mounted to the chassis for pivotal movement about a first pivot axis and having a first pivotal connection to the spindle and a second control arm pivotally mounted to the chassis for pivotal movement about a second pivot axis and having a second pivotal connection to the spindle spaced from the first connection. The pivot axis of each control arm and the connection of that control arm to the spindle define a control arm plane; the control arm planes intersect to define a control line that intersects a vertical plane containing said longitudinal axis.

45 Claims, 17 Drawing Sheets

US 6,942,050 B1

SNOWMOBILE FRONT SUSPENSION SYSTEM AND METHOD

FIELD OF THE INVENTION

The invention relates to snowmobile front suspension systems.

BACKGROUND OF THE INVENTION

A variety of front suspension systems have been employed on snowmobiles over the years. In the early 1980s, the assignee of the present invention introduced to the snowmobiling industry an independent front suspension system utilizing a trailing arm—an elongated arm having its front end rigidly connected to the steering spindle and its rear-end pivotally connected to the chassis. See Canadian Patent No. 1,227,823, and also U.S. Pat. Nos. 6,328,124 and 6,343,666. Front suspension systems employing trailing arms have been widely accepted in the snowmobile industry. When a snowmobile ski encounters an object during operation, the suspension system is designed to permit the ski to travel over the object while providing a relatively smooth, controlled ride to the driver. Some of the force of the perturbance is transmitted by the trailing arm to the chassis, and this in turn produces a yaw moment. Also, as illustrated in FIGS. 1 and 2 of the drawing, the necessary positioning of the trailing arm takes up space and increases the difficulty of appropriately and functionally designing that area of the vehicle.

Moreover, the stiffness of the front suspension of the snowmobile is important both to the rider's comfort and the ability to control the snowmobile. On the one hand, the suspension should be sufficiently "soft" as to provide a smooth ride over fairly level ground. On the other hand, the suspension should be sufficiently stiff so that the snowmobile suspension does not "bottom out" when the snowmobile is operated in rough terrain. Shock absorbers are commonly used for this purpose, and have been commonly mounted in snowmobiles with trailing arm suspensions such that as the suspension is compressed, the compressive axis of the shock absorber becomes less aligned with the generally vertical direction of ski displacement with respect to the chassis, and this leads to the suspension becoming softer as the front suspension is compressed, in turn leading to bottoming-out problems. That is, the motion ratio of shock absorber movement to vertical ski movement may be reduced as the suspension is compressed, leading to a diminished ski rate.

It may be appreciated that suspension systems for snowmobiles are in fact quite sophisticated, technically. Not only must one consider the problems raised above in connection with trailing arm suspensions, but also problems involving caster angle and ease of steering and control, problems involving the tendency of a snowmobile to "dive" when braked hard or when encountering obstacles, and problems involving the expected increase in camber angle (and the resulting tendency of the skis to "scrub" or drift sideways) when the chassis of the snowmobile rolls during sharp turns.

The applicants have now found that further improvements in front suspension systems can be made to avoid trailing arms while maintaining high performance advantages for the rider.

BRIEF SUMMARY OF THE INVENTION

The present invention in one embodiment provides a snowmobile having a longitudinal axis and a chassis, a pair of skis each having a steering spindle defining a steering axis, and a suspension system joining each steering spindle to the chassis. Each suspension system comprises a first control arm pivotally mounted to the chassis for pivotal movement about a first pivot axis and having a first connection to the spindle and a second control arm pivotally mounted to the chassis for pivotal movement about a second pivot axis and having a second connection to the spindle spaced from the first connection. The pivot axis of each control arm and the connection of that control arm to the spindle defines a control arm plane, and the control arm planes for each ski intersect to define a control line that intersects a vertical plane containing said longitudinal axis. The structure enables such performance characteristics as changes in caster upon compression of the suspension to be adjusted.

In another embodiment, the invention provides a snowmobile having a longitudinal axis and a chassis, a pair of skis each having a steering spindle defining a steering axis, and a suspension system joining each steering spindle to the chassis, the suspension system comprising, for each ski, a first control arm pivotally mounted to the chassis for pivotal movement about a first pivot axis and a second control arm spaced from the first control arm and pivotally mounted to the chassis for pivotal movement about a second pivot axis, said first and second pivot axes being fixed with respect to each other and with respect to the chassis. The control arms extend between the chassis and the steering spindle to continuously define the steering axis as the suspension system is compressed. The first and second pivot axes are non-parallel, and the control arms are so attached to said steering spindle that when said suspension is compressed toward a fully compressed condition, the caster angle of the steering spindle is increased.

In certain embodiments, the control arms of each ski suspension are so oriented that as the suspension of a snowmobile at rest is compressed toward a fully compressed condition from a partially compressed condition to mimic the compression due to roll as the snowmobile is steered into a tight turn, the camber angle of the ski is moved in the negative direction. In other embodiments, one of the control arms is positioned generally beneath the other, and the suspension system for each ski includes a shock absorber mounted at one end to the chassis and at the other end to the lower control arm at a point spaced from the chassis and is oriented so that as the suspension system is compressed, the motion ratio of movement of the shock along its axis to the vertical movement of the ski increases to thereby increase ski rate.

DETAILED DESCRIPTION OF THE INVENTION

Figure 1:
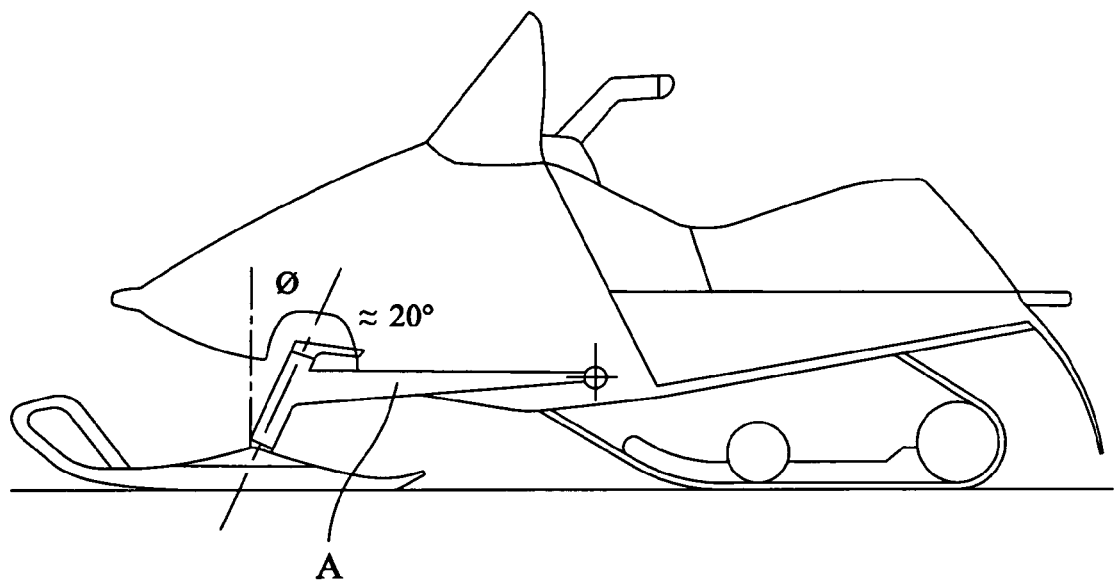
FIG. 1 is a schematic view of a snowmobile of the prior art, illustrating the use of a trailing arm.
Figure 2:
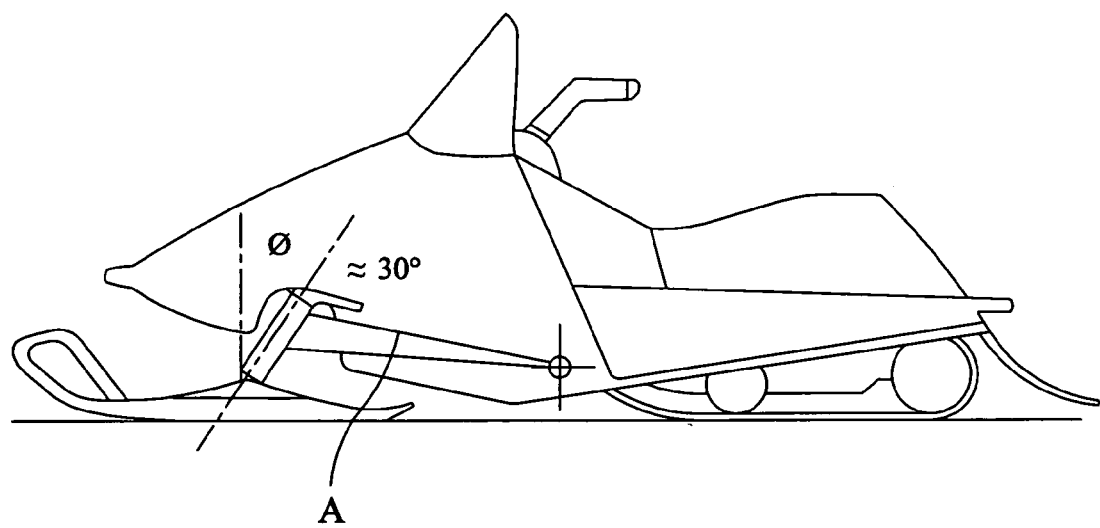
FIG. 2 is a similar view of a prior art snowmobile that of FIG. 1 but showing the trailing arm when the front suspension system has been compressed.

A prior art snowmobile utilizing a trailing arm suspension is schematically shown in FIGS. 1 and 2. A trailing arm "A" is pivotally attached at its rearward end to the chassis of the snowmobile, and the forward end of the trailing arm is attached to a housing for the steering spindle of a ski. FIG. 1 shows the snowmobile at rest, with a caster angle $\Phi$ between the vertical and the backward leaning steering axis of the ski which may be in the range of 20°. FIG. 2 shows the same snowmobile with its front suspension compressed, as when the snowmobile may hit a bump. Here, the pivotal attachment of the rear-end of the trailing arm to the chassis has moved downwardly, and the caster angle $\Phi$ has accordingly become larger, e.g., in the range of 30°, the larger caster angle improving the stability of the snowmobile. Forces directed rearwardly on the trailing arm are transmitted to the chassis at the pivotal connection of the trailing arm with the chassis, and this tends to produce yaw.

With reference to the drawings, since the front suspension for the left and right skis are substantially symmetrical about a vertical plane extending along and containing the longitudinal axis LA of a snowmobile 10, only the mechanism with respect to the left ski need be discussed, the right ski mechanism being identical. Moreover, in the various embodiments depicted in the drawing, similar items may be identified by similar reference numbers.

A snowmobile ski is shown at 12, the ski being attached to a steering spindle 14 that defines the steering axis 16 of the ski. Attached to the spindle is a lower control arm exemplified as a lower A-shaped arm 18 having forward and rearward ends 20, 22 that are each pivotally attached to the chassis 19. The apex 24 of the A-arm is pivotally attached at 15 to an intermediate portion of the steering spindle 14 through a ball joint, pin joint or other suitable pivotal connection. The pivotal attachments 20, 22 of the lower A-arm define a pivot axis 26 about which the lower A-arm member pivots as the suspension is compressed.

An upper control arm is attached to the spindle housing and is exemplified as an upper A-arm 28 that is pivotally attached at its forward and rearward ends 30, 32 to the chassis, these pivot points defining a second, upper pivot axis 34. The apex 36 of the upper A-arm is pivotally operatively attached at 35 to the steering spindle by means of a ball joint, pin joint or other suitable pivotal connection, at a point spaced above the pivotal attachment of the lower A-arm to the spindle housing. The attachments of the A-arm members to the chassis and to the steering spindle thus continuously control the orientation of the steering spindle and thereby continuously define the steering axis with respect to the chassis as the suspension is vertically displaced, as when it is compressed or extended.

Figure 4:
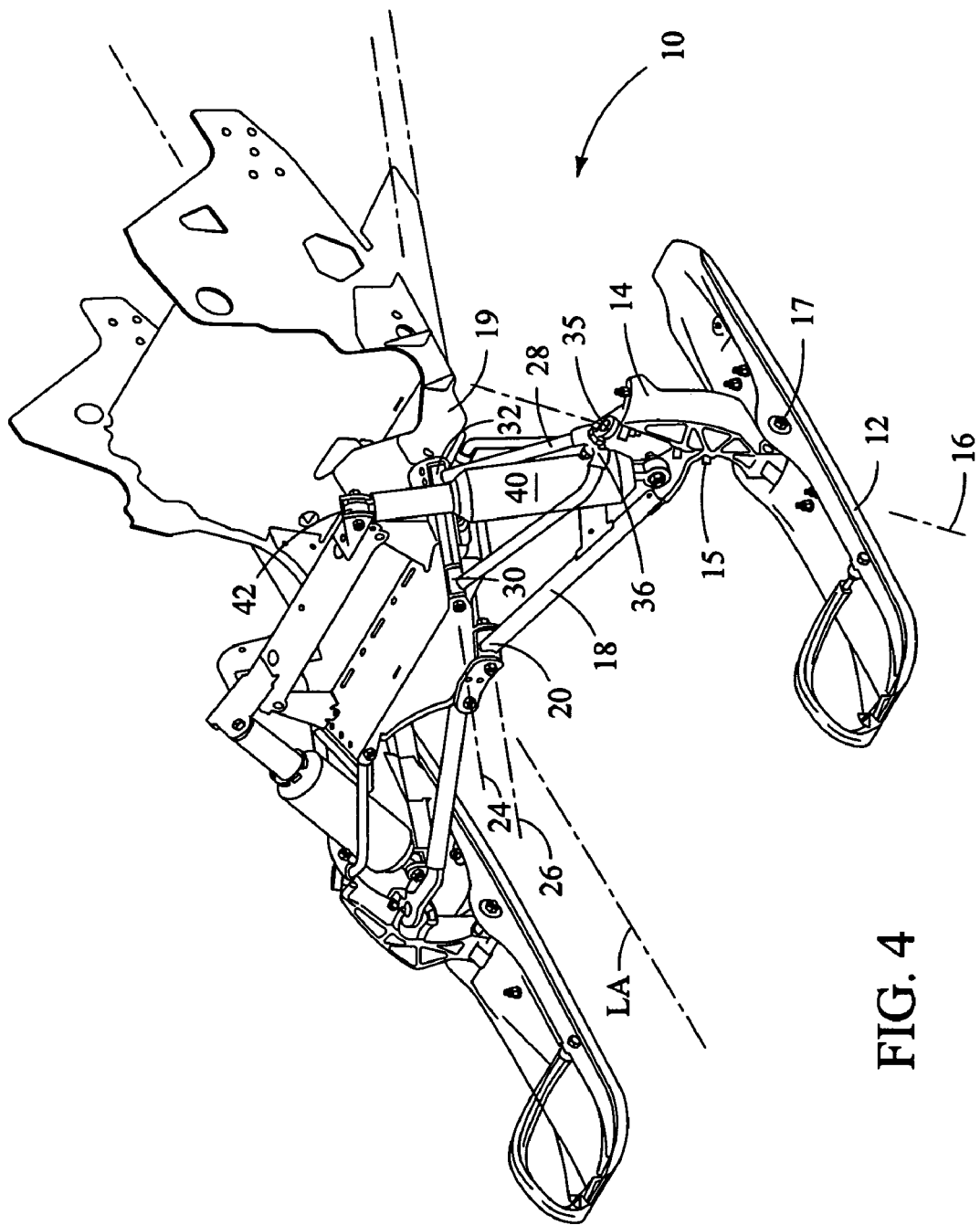
FIG. 4 is a broken-away perspective view showing details of a snowmobile suspension.
Figure 10A:
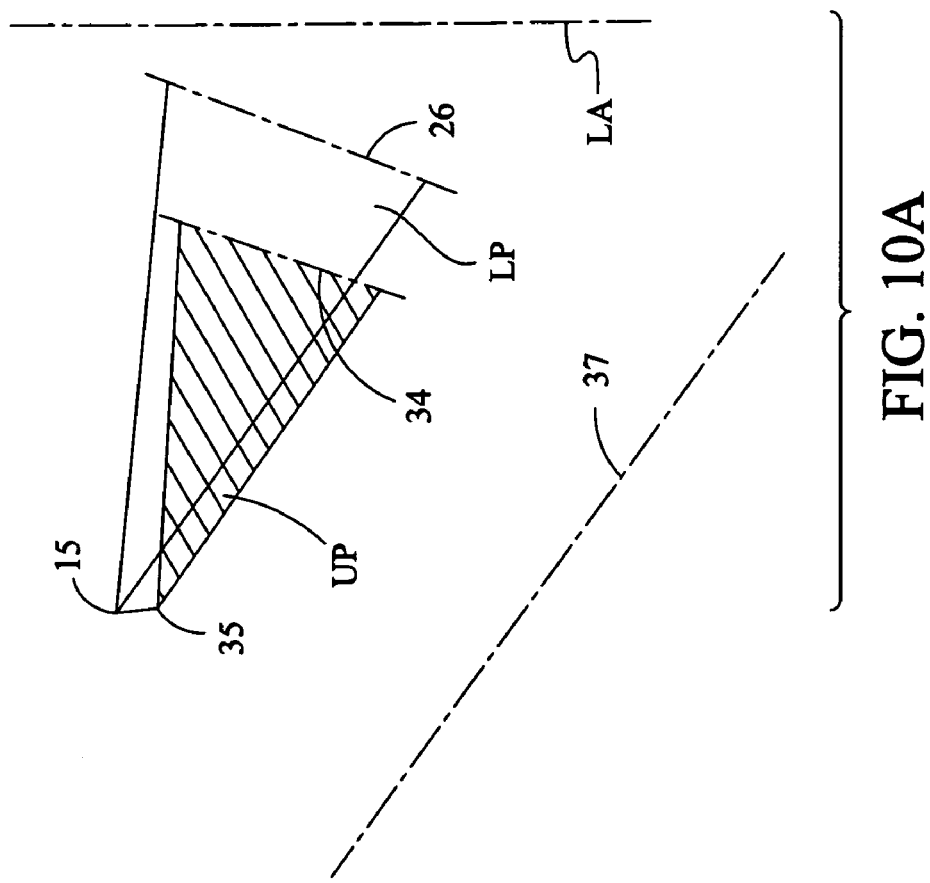
FIGS. 10A, B and C are conceptual, schematic top, side and perspective views, respectively, of an embodiment of a snowmobile of the invention showing control arm planes, pivot axes and plane intersection lines, with the front of the snowmobile in FIG. 10C being in the lower left corner of the page.
Figure 10B:
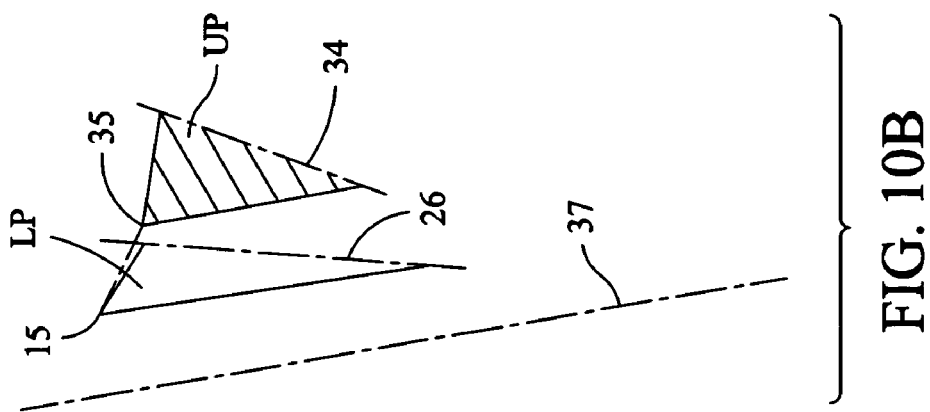
Figure 10C:
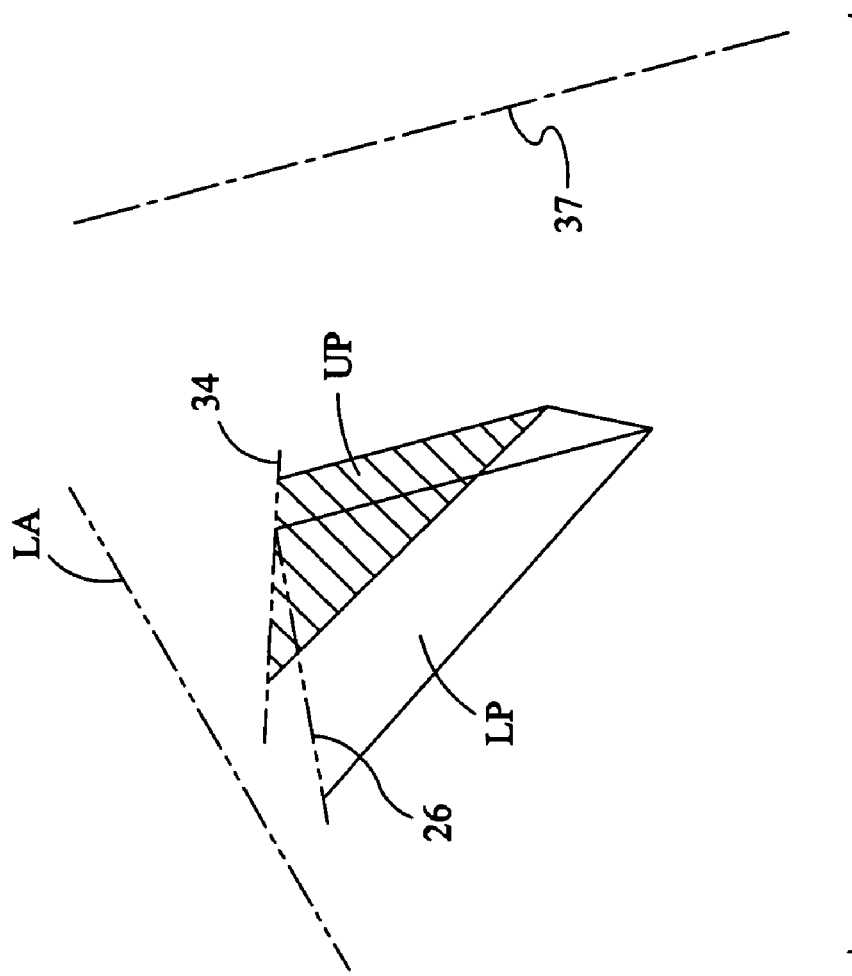

Referring to FIGS. 4 and 10A, B and C, the pivot axis 26 of the lower control arm and the pivotal connection 15 of that arm to the steering spindle 14 defines a plane shown in FIG. 10 as LP. Similarly, the pivot axis 34 of the upper control arm 28, together with its pivotal connection 35 to the steering spindle 14, defines a plane shown in FIG. 10 as UP, this plane being illustrated as cross-hatched so that it can easily be distinguished from plane LP.

The planes LP and UP in certain embodiments are not parallel to each other. As the suspension is compressed from a rebound condition to a fully compressed condition, the planes move with respect to the ground. The planes LP and UP intersect at an intersection line (sometimes referred to below as a "control line") 37 that intersects a vertical plane that contains the longitudinal axis LA of the snowmobile. In some embodiments, the pivot axes 26 and 34 are substantially non-parallel to each other, and in other embodiments, these axes may be parallel to each other provided that the planes LP and UP intersect at a control line 37 that intersects the vertical plane containing the longitudinal axis LA of the snowmobile.

It will be understood that as the suspension assembly is compressed, the orientation of the planes LP and UP will change with respect to the ground inasmuch as the chassis (and hence the pivot axes) will descend closer to the ground while the height above ground level of the connections of the control arms to the steering spindle will remain nearly unchanged.

Figure 8:
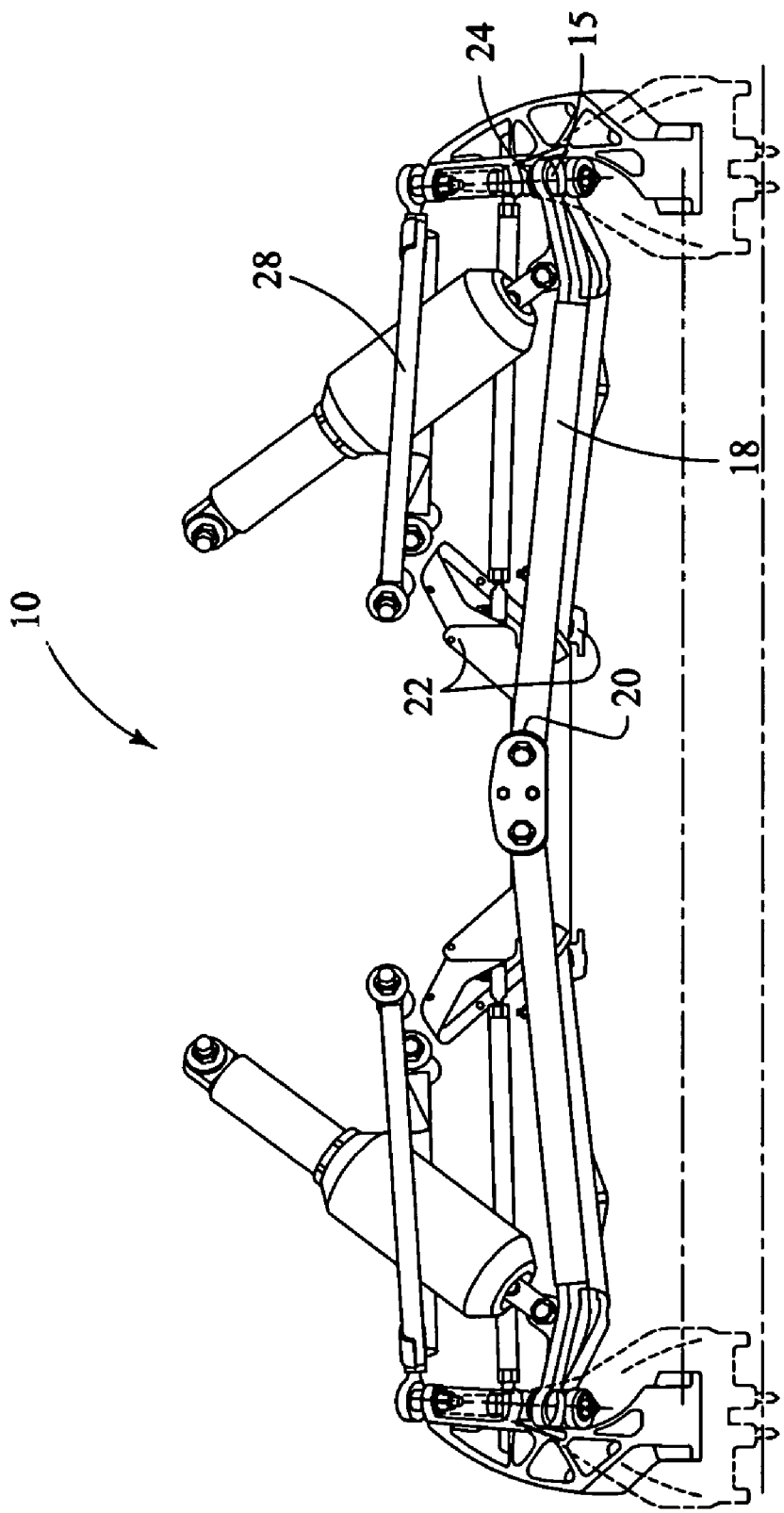
FIG. 8 is a broken-away front view of the snowmobile of FIG. 7 but showing the front suspension in a partially compressed condition.
Figure 9:
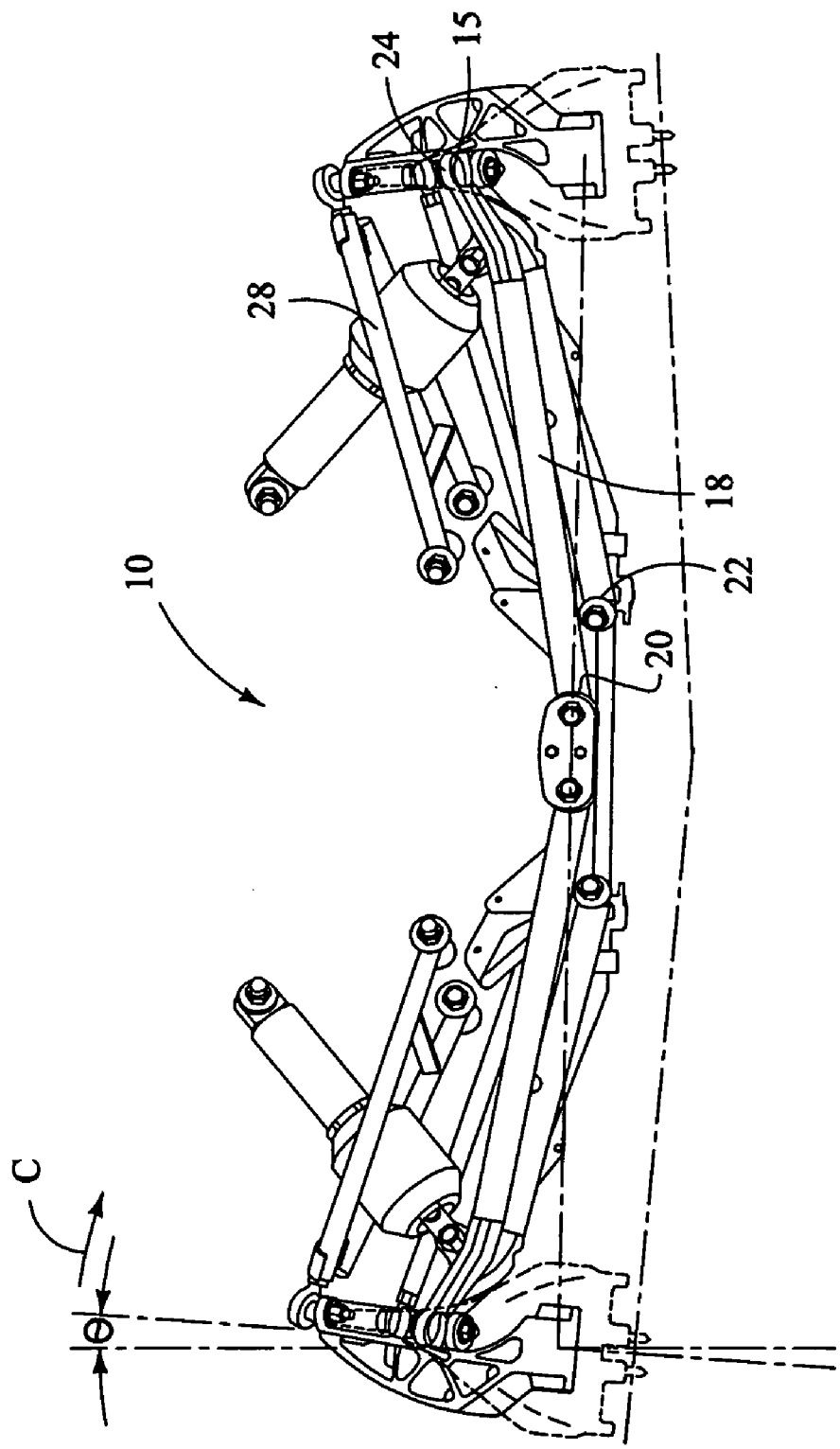
FIG. 9 is a broken-away front view of the snowmobile of FIG. 8 but showing the front suspension in a fully compressed condition.
Figure 13:
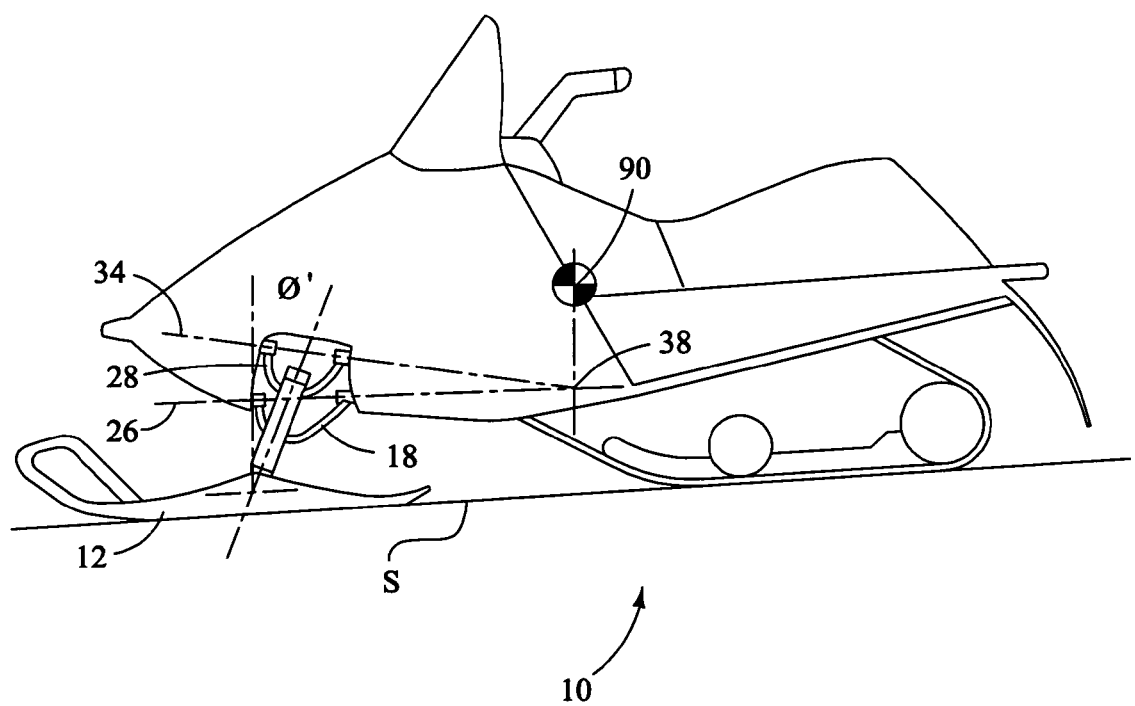
FIGS. 13 and 14 are schematic side views of a snowmobile of the invention with the suspension at rest and compressed, respectively.
Figure 14:
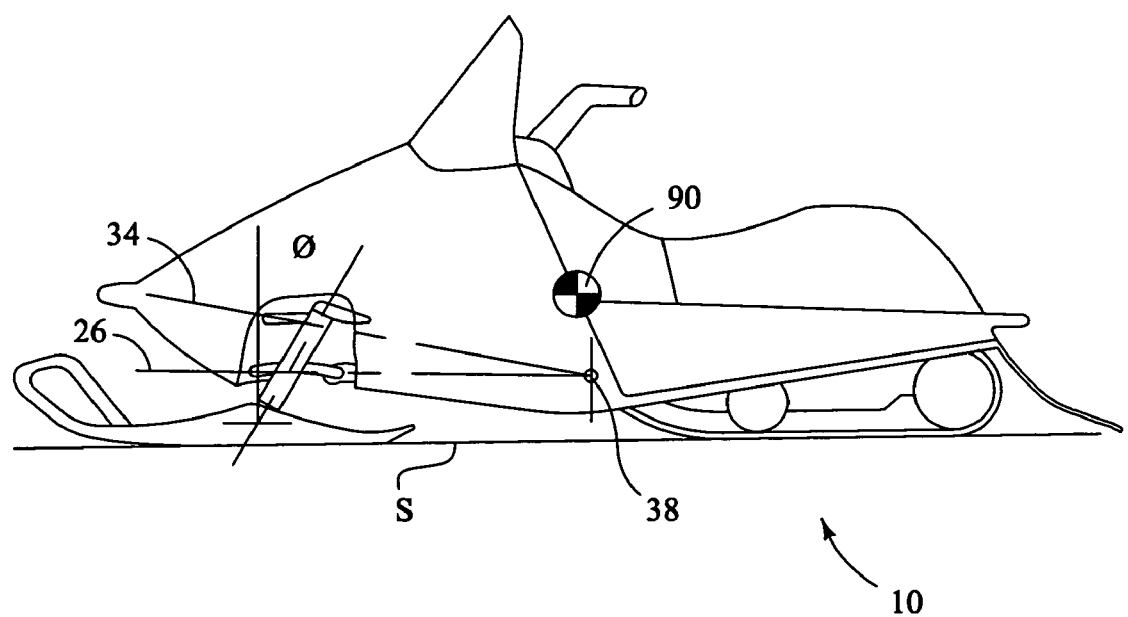

By appropriately orienting the pivot axes and the connections of the control arms to the steering spindle, the orientation of the steering spindle can be controlled as desired as the suspension is compressed, as when a snowmobile is driven over rugged terrain, obstacles are encountered, and tight turns are made. For example, as shown in FIGS. 13 and 14, the caster angle of the steering axis may be caused to increase as the suspension is compressed. As will be understood from a comparison of FIGS. 8 and 9, the camber angle $\theta$ of the skis may be caused to move in a negative direction, as shown by arrow C in FIG. 9, as the suspension is compressed from a partially compressed condition toward a fully compressed condition. FIGS. 8 and 9 show the snowmobile at rest, but mimic the compression of the suspension as the snowmobile is driven in a tight turn. Under these conditions, the snowmobile tends to roll toward the outside of the turn as the suspension for the outer ski is compressed, and this, in turn, tends to cause the camber angle of the outside ski to increase, that is, the upper end of the steering spindle tends to lean outwardly and lift the inner edge of the ski. The purpose of causing the camber angle to move in the negative direction upon compression of the suspension is to at least partially or completely offset the expected increase in camber angle due to roll of the vehicle in a tight turn. By "fully compressed" and "full compression", as used herein, reference is made to the maximum compression of the suspension permitted by the shock absorber.

Figure 5:
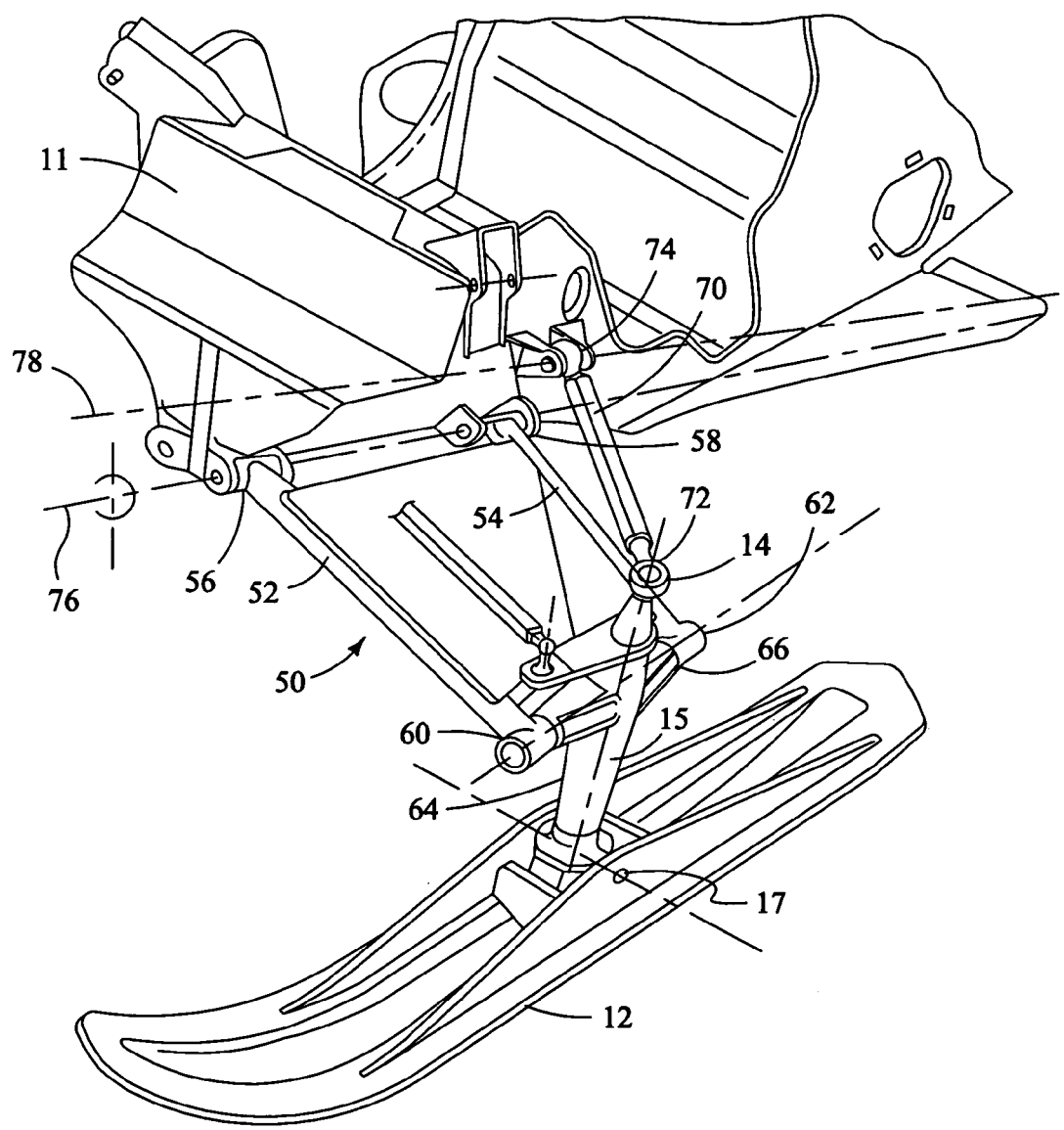
FIG. 5 is a broken-away, perspective view showing a modified embodiment of a snowmobile of the invention.
Figure 7:
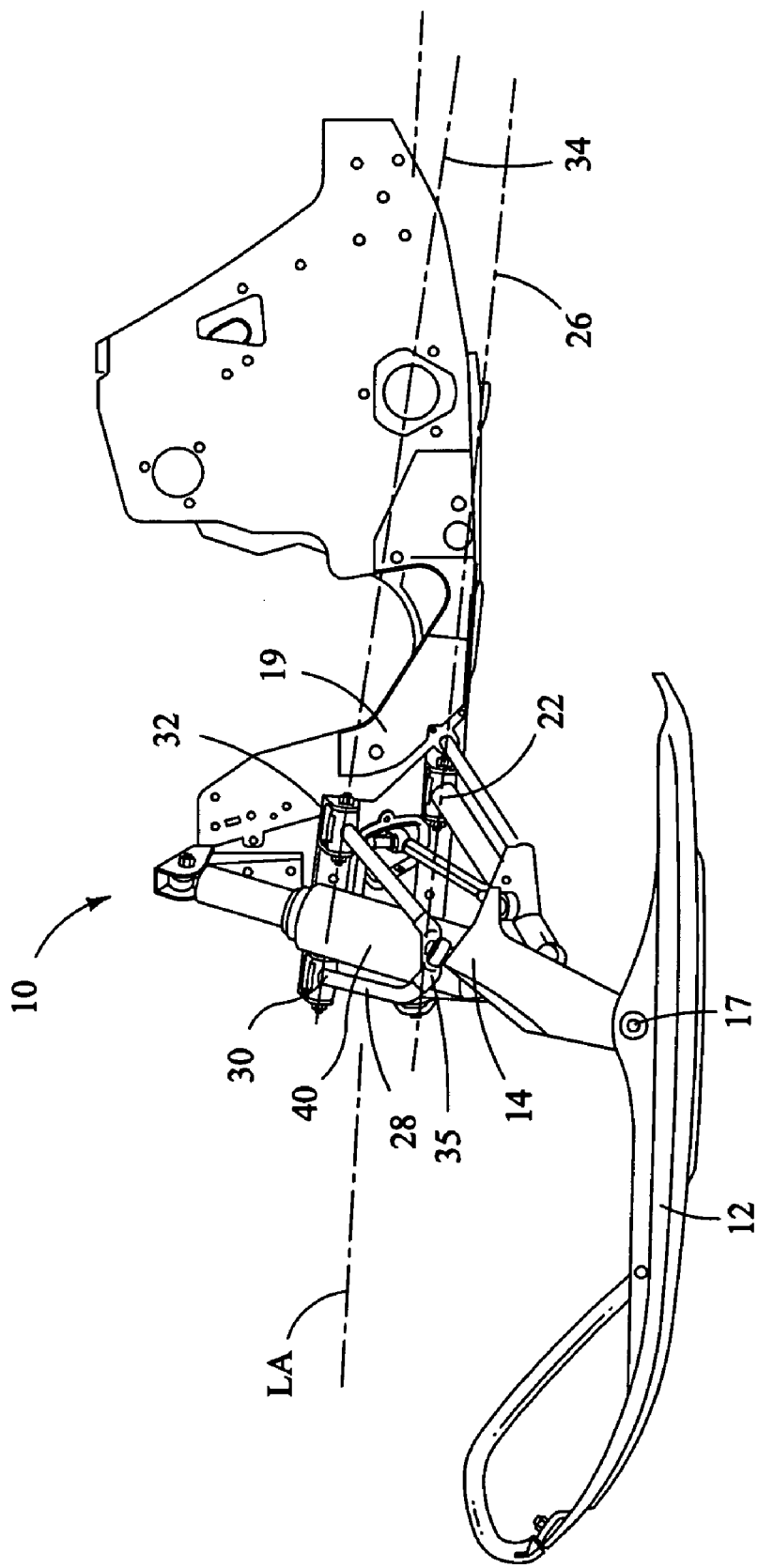
FIG. 7 is a broken-away side view of the snowmobile of FIG. 6.

The control arms exemplified as 18 and 28 in the drawing are generally elongated and may have any appropriate configuration. A control arm is attached with a pivotal attachment to the chassis such that the pivotal attachment defines a pivot axis. The control arm is also attached to the steering spindle, either directly or indirectly, in a manner enabling the spindle to pivot with respect to the control arm, and this attachment may be a ball joint, pin joint or other suitable pivotal connection. In the embodiment of FIG. 7, for example, the control arm 28 is generally A-shaped, with its two struts having spaced forward and rearward ends 30, 32 that are pivotally connected to the chassis, the apex of the A-shaped arm being connected pivotally to the steering spindle at 35 by a ball joint, a pin joint or other suitable connection. In FIG. 5, however, the upper control arm 70 is in the form of a link having an end that is pivotally attached at 74 to the chassis to define a pivot axis 78. The link is pivotally attached at its other end 72 to the steering spindle by a ball joint, pin joint or other suitable pivotal connection. Note also in FIG. 5 that the lower control arm has a pair of struts 52, 54 each pivotally attached at their inner ends to the chassis to define a pivot axis 76, and each pivotally attached at their outer ends to side arms of the steering spindle.

Figure 3:
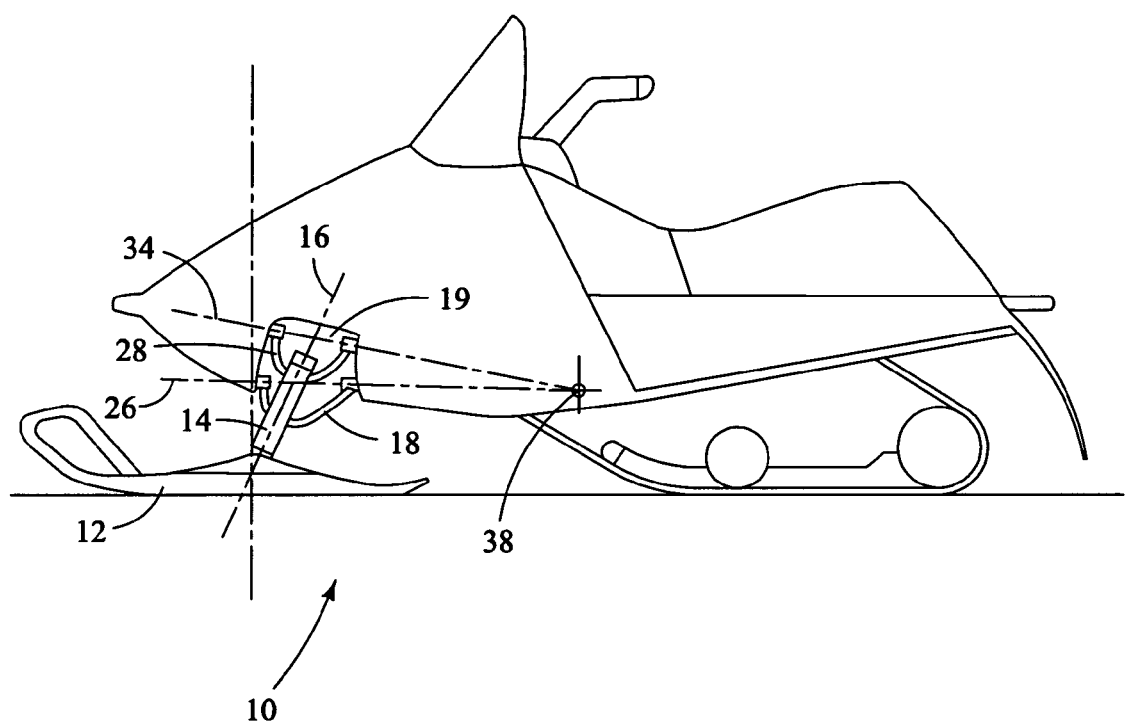
FIG. 3 is a schematic side view of a snowmobile produced in accordance with the invention.

Referring to FIG. 3 which shows an embodiment of the invention, if the snowmobile is viewed specifically from the side, the pivot axes 26, 34 appear to intersect at a point 38. This point 38 is fixed with respect to the chassis since the pivot axes 26, 34 defining the intersection point are also fixed with respect to the chassis. In this manner, the intersection point substitutes for the rearward attachment to the chassis of trailing arms in prior snowmobiles, and the drawbacks associated with trailing arms are largely avoided.

The ratio of the movement of the shock absorber along its axis to the movement of the ski is commonly referred to as the motion ratio. Shock absorbers commonly have a damping element and a compression spring element. "Ski rate" is the measure of the force needed to compress the shock absorber further at any degree of compression thereof. In certain embodiments of the invention, the shock absorber and the control arms are so oriented as to cause an increase in the motion ratio as the suspension is compressed, and in such embodiments a progressive ski rate is obtained; that is, the ski rate increases as the suspension is compressed so that the suspension compresses easily when the vehicle is driven over fairly level terrain to provide a smooth, comfortable ride but becomes progressively more difficult to compress as compression increases, as when the vehicle is ridden over rugged terrain.

A shock absorber 40, as shown in FIG. 4, may be pivotally attached at its upper end 42 to the chassis, for example, at a point above pivotal attachments 30, 32 of the upper A arm to the chassis. At its lower end 44, the shock absorber is attached to the lower A arm at a point near the apex 24; in this manner, as the front suspension of the snowmobile is compressed, the force exerted by the shock absorber to resist further compression increases. As a result, when the suspension is uncompressed or only slightly compressed, as when the snowmobile is ridden across a smooth landscape, the response of the shock absorber is "soft," whereas when the compression of the front suspension becomes more pronounced, as when rough terrain is encountered, the suspension becomes stiffer so as to avoid bottoming out.

Referring now more particularly to FIG. 5, a modification of a snowmobile suspension system is shown in which the steering spindle 14 of a snowmobile ski is attached (here, through its housing 15 that contains side arms 64, 66) to the chassis by a lower control arm suspension 50 having struts 52, 54. As noted above, the struts each are pivotally attached at one end to the chassis at 56, 58, respectively, and are attached at their forward ends 60, 62 to the spindle 14 through strut side arms 64, 66, respectively. At a point spaced above the lower control arm, a control arm in the form of an elongated link 70 is pivotally attached to the spindle at 72, the other end of the support control arm 70 being pivotally attached at 74 to the chassis. The attachments 56, 58 of the lower control arm suspension of the chassis define a lower pivot axis 76, and the attachment 74 of the upper support control arm to the chassis defines an upper pivot axis 78, these axes being substantially non-parallel. The axes 76 and 78, together with the pivotal attachments of the respective control arms to the steering spindle, define planes that intersect to form a control line, and the axes themselves, in this embodiment, as viewed from the side of the snowmobile, appear to intersect to define an intersection point 38, as discussed above with respect to FIG. 3.

With respect to the specific embodiments exemplified in FIG. 3, the pivot axes of the control arms, as viewed from the side, converge and appear to intersect at the intersection point 38. In these embodiments, the intersection point, while the snowmobile is at rest, may be vertically positioned with respect to ground level by a distance in the range of about ±1.2 times the height of the center of gravity of the snowmobile, and the intersection point also may lie rearwardly from the ski pivot 17 joining the spindle to the ski by a distance not exceeding about four snowmobile lengths. Positioning the intersection point between ground level and about 1.2 times the height of the center of gravity above ground level may aid in restraining dive.

With reference to FIG. 13, a snowmobile 10 is depicted having an A arm suspension of the type described above in connection with FIGS. 3 and 4. In this embodiment, the two pivot axes 26, 34 converge rearwardly and appear to intersect, as viewed from the side, at intersection point 38. Inasmuch as the pivot axes 26, 34 are fixed with respect to the chassis, the position of intersection 38 with respect to the chassis similarly is fixed and is independent of the degree of compression of the front suspension. FIG. 7 shows the snowmobile at rest, and the caster angle $\Phi$ may, for example, be about 20 degrees. When the suspension is compressed, as illustrated in FIG. 14, the intersection point 38 has moved downwardly with respect to the ground, and the caster angle has increased to, for example, about 30 degrees. Due to the fact that the pivot axes 26, 34 are substantially non-parallel, as the A arms pivot upwardly with respect to the chassis as the suspension is compressed, the angle that the steering axis makes with the vertical (that is, the caster angle) thus is increased. Moreover, as noted above, the intersection point is positioned with respect to the center of gravity so as to diminish the dive experienced when the snowmobile is braked or encounters an obstacle.

In the embodiment of FIGS. 13 and 14, the location of the intersection point 38 with respect to the chassis may thus be varied as desired by varying the pivot axes 26, 34, and this in turn enables the caster angle $\Phi$, and its degree of change due to compression of the suspension, to be controlled. In this manner, one gains additional freedom in the ability to design front suspensions inasmuch as one is not confined to any specific location on the chassis for attachment of a trailing arm. That is, whereas with trailing arm technology, the rear end of the trailing arm was required to be fixed to the chassis at a point convenient for other snowmobile structure, such as the feet of the rider and passenger, and the intersection point provided by the invention may be placed wherever it is functionally most desirable.

Figure 6:
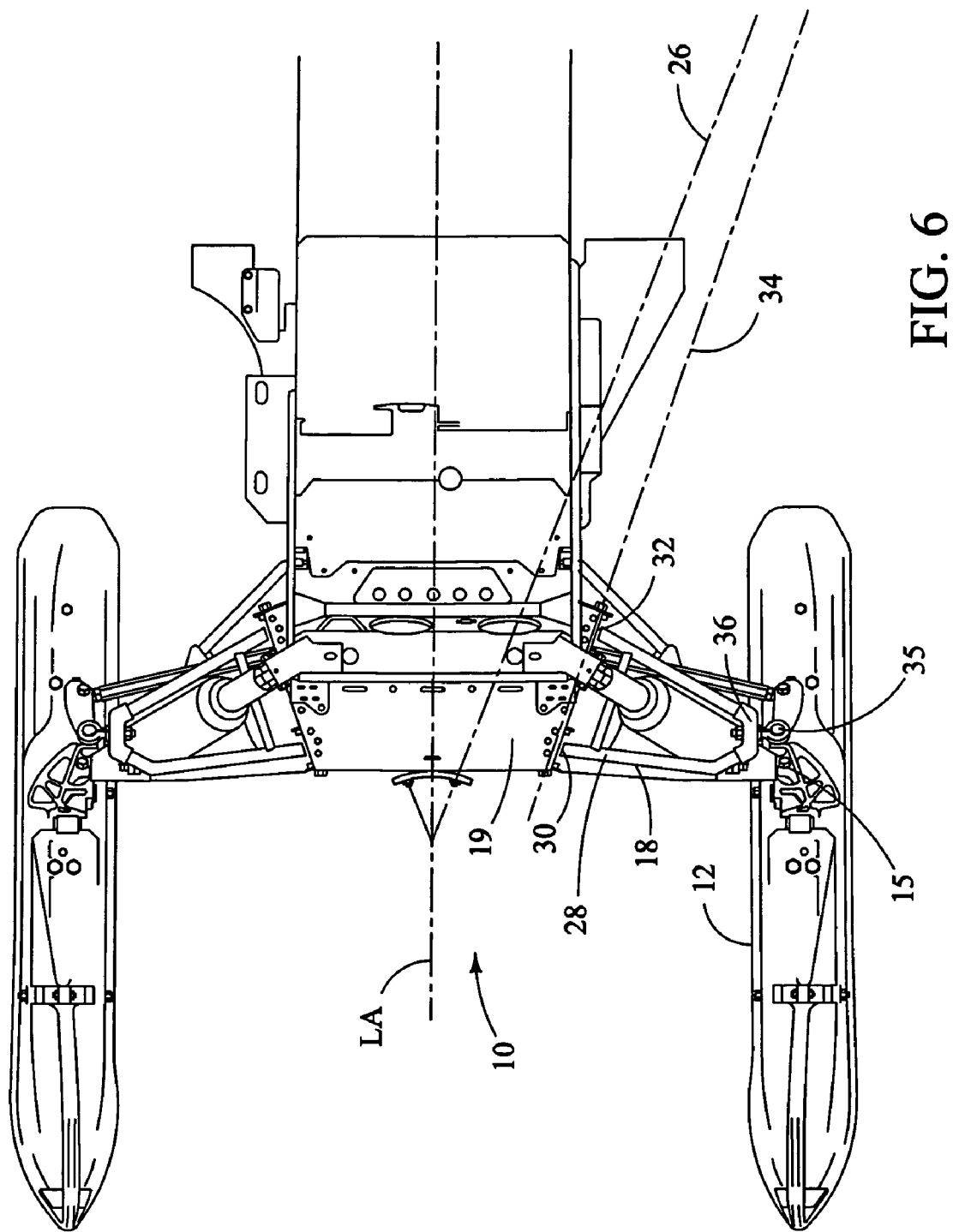
FIG. 6 is a broken-away top view of the snowmobile shown in FIG. 4.

The non-parallel pivot axes defined by the pivotal attachments of the control arms to the chassis may be varied as desired to accomplish the desired ski and/or steering spindle movement as the suspension is compressed. In the embodiment of FIGS. 4 and 6, for example, the pivot axes diverge rearwardly with respect to the vertical plane passing through the longitudinal axis LA of the snowmobile. In each embodiment, the pivot axes are substantially non-parallel in the three-dimensional sense, although they may appear substantially parallel when viewed from the side or the top or from some other angle. FIGS. 11 and 12 are illustrative.

Figure 11A:
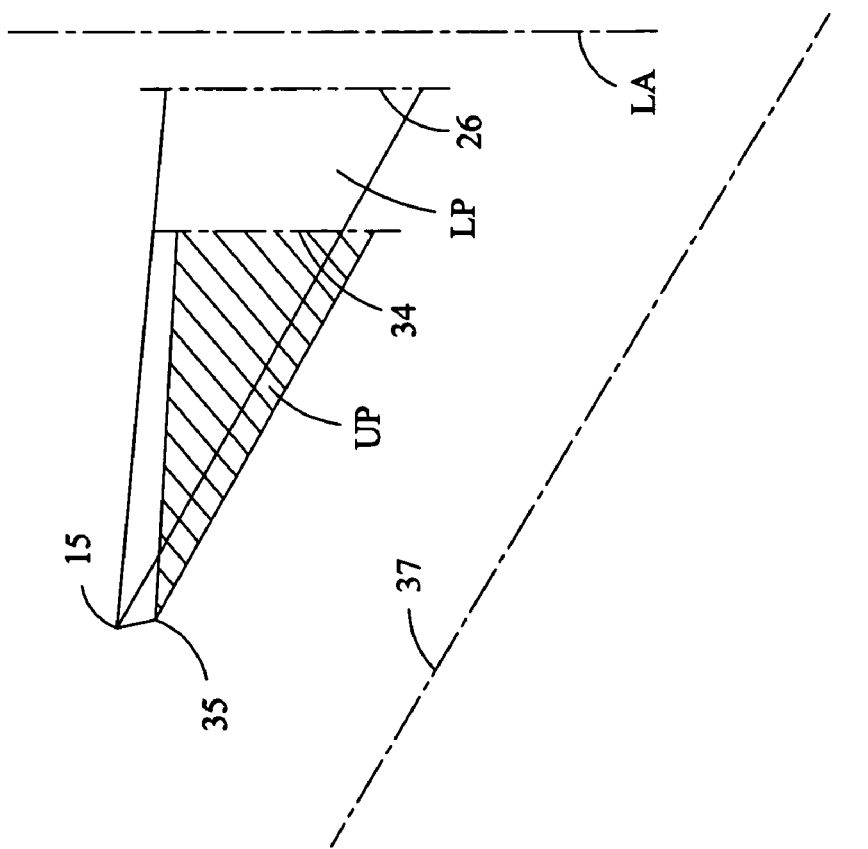
FIGS. 11A, B and C are conceptual, schematic top, side and perspective views, respectively, of another embodiment of a snowmobile of the invention showing control arm planes, pivot axes and plane intersection lines; with the front of the snowmobile in FIG. 11C being in the lower left corner of the page.
Figure 11B:
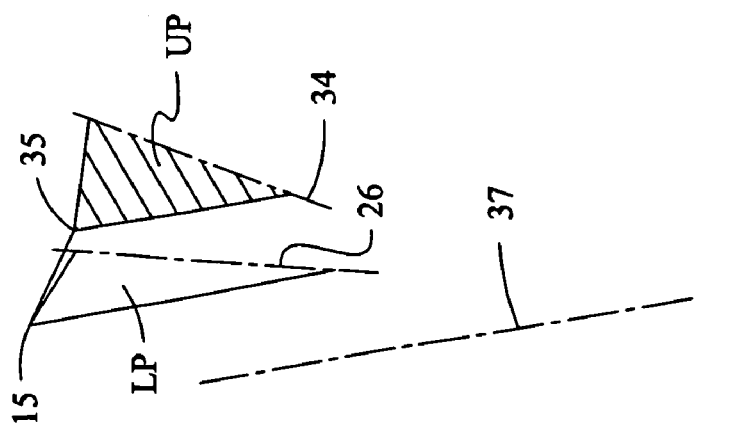
Figure 11C:
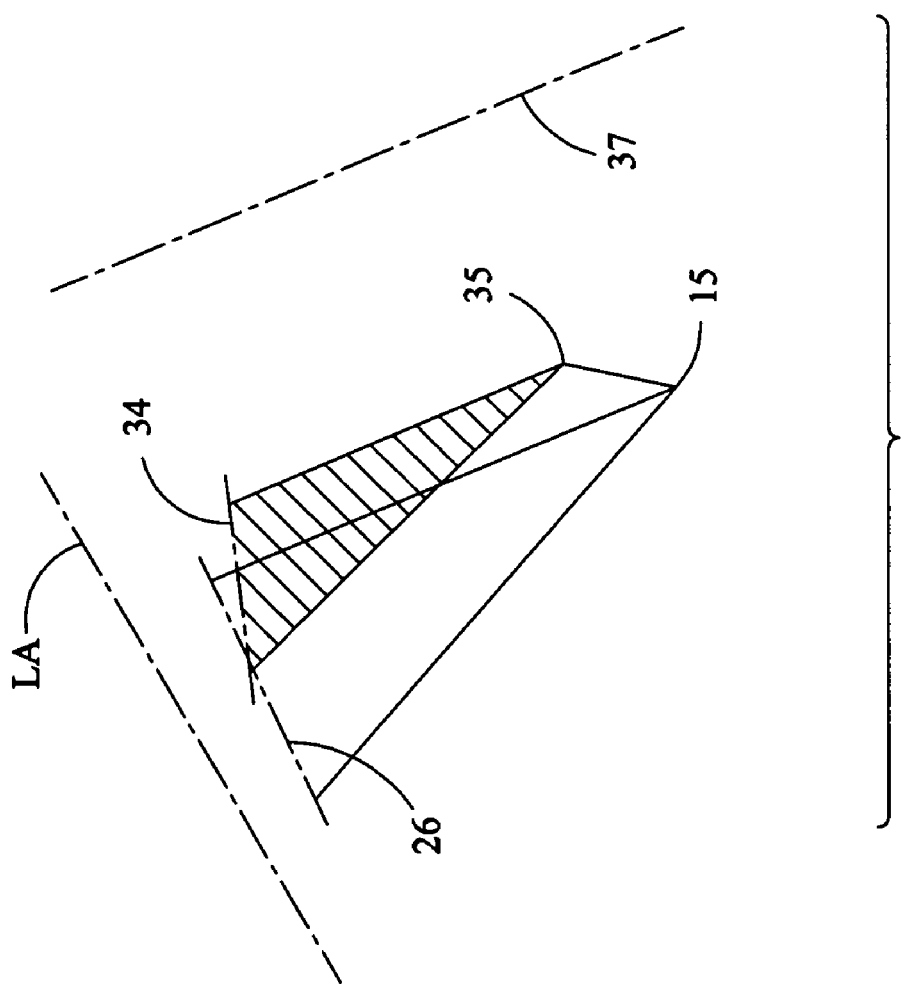

FIGS. 11A, B and C are top, side and perspective views, respectively, of an embodiment of a snowmobile of the invention. Although the pivot axes 26 and 34 are substantially non-parallel in a 3-dimensional sense, they do appear parallel when viewed from above, that is, in FIG. 11A. In this figure, the front of the snowmobile is at the top of the figure. FIG. 11B shows a side view of the same snowmobile embodiment. In FIG. 11A, the pivot axes 26 and 34 appear parallel to the chassis centerline LA, and it will be appreciated that in this view, the vertical plane that includes the longitudinal axis of the snowmobile is perpendicular to the plane of the paper. The pivot axes 26 and 34, even though parallel, need not be parallel to the longitudinal axis LA.

Figure 12A:
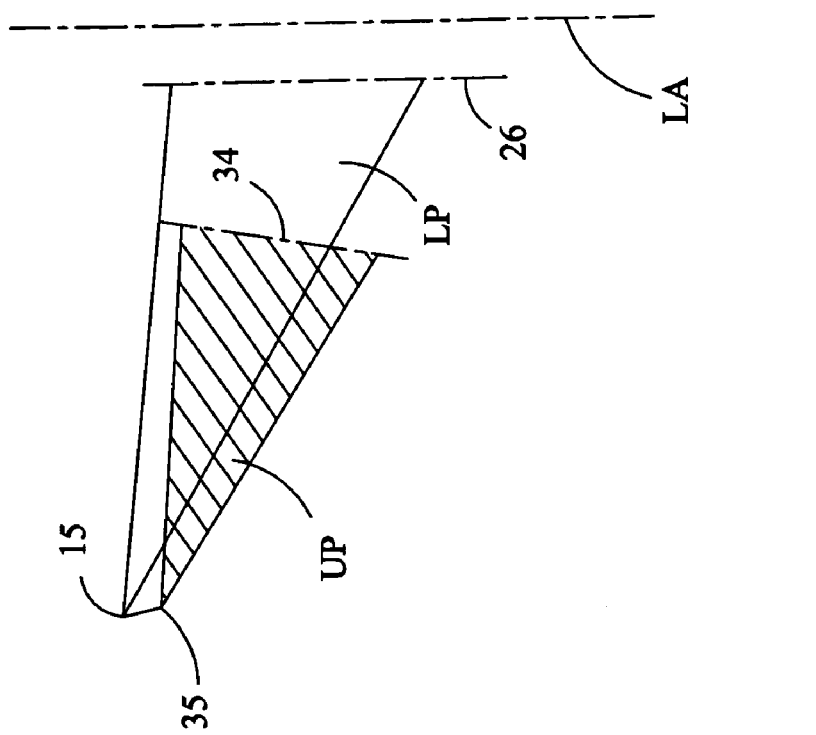
FIGS. 12A, B and C are conceptual, schematic top, side and perspective views, respectively, of yet another embodiment of a snowmobile of the invention showing control arm planes, pivot axes and plane intersection lines, with the front of the snowmobile in FIG. 12C being in the lower left corner of the page.
Figure 12B:
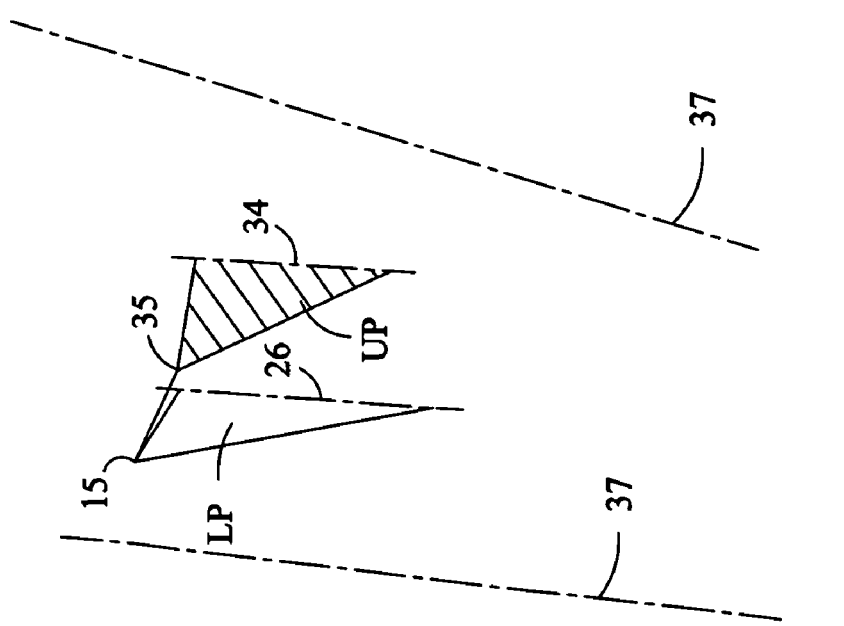
Figure 12C:
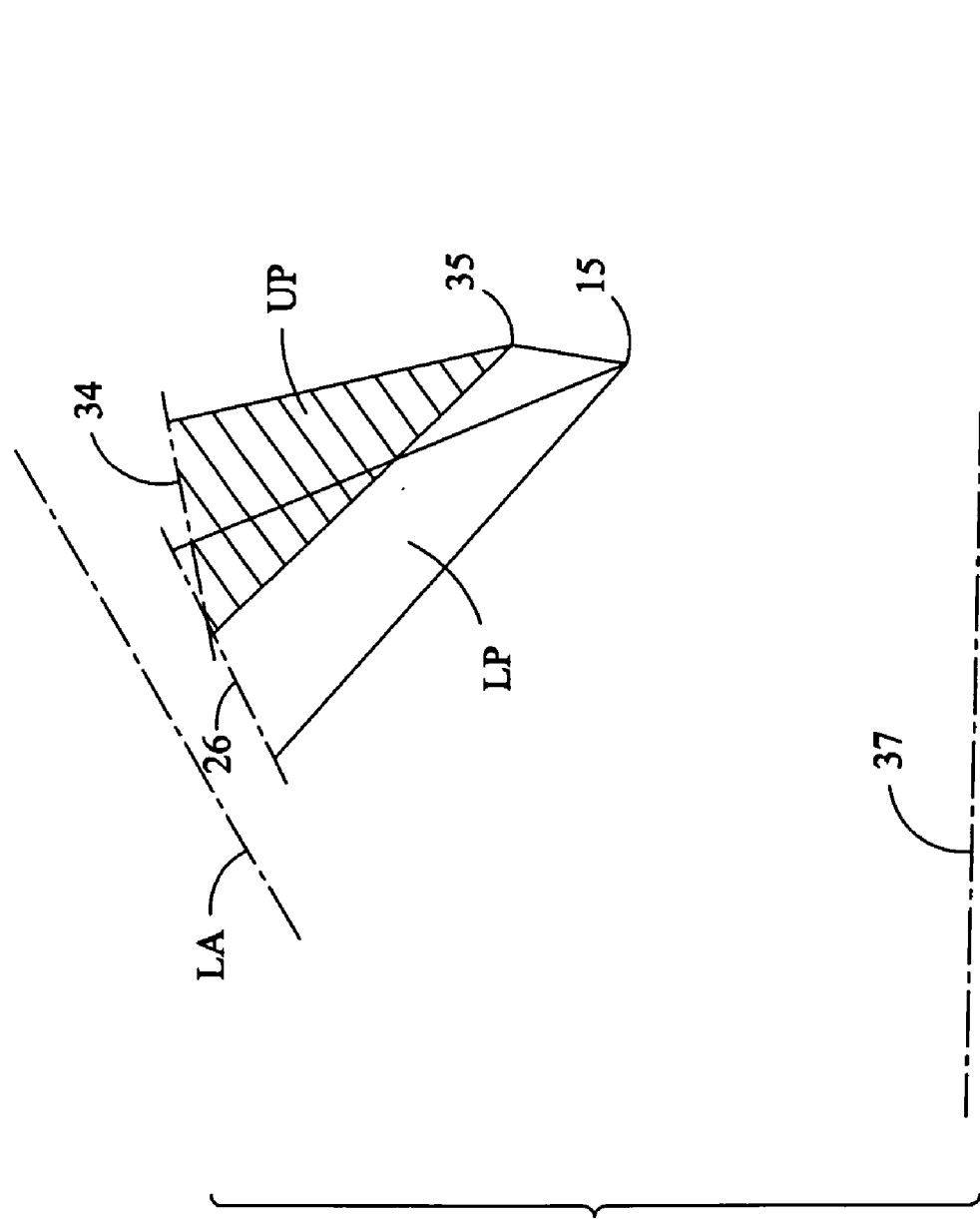

FIGS. 12A, B and C show an embodiment in which the pivot axes are substantially parallel when viewed from the side (FIG. 12B) but are substantially non-parallel when viewed from the top (FIG. 12A). FIGS. 10–12 illustrate the flexibility that is afforded by the present invention in controlling the characteristics of the suspension as the suspension is compressed. A number of variables need to be taken into consideration here, including the positioning of the control arms, the orientation of the pivot axes, the location of the pivotal attachment of the control arms to the steering spindle and the distance between these connections.

While a preferred embodiment of the present invention has been described, it should be understood that various changes, adaptations and modifications may be made therein without departing from the spirit of the invention and the scope of the appended claims.

What is claimed is:

1. A snowmobile having a longitudinal axis and a chassis, a pair of skis each having a steering spindle defining a steering axis, and a suspension system joining each steering spindle to the chassis, the suspension system comprising, for each ski, a first control arm pivotally mounted to the chassis for pivotal movement about a first pivot axis and having a first connection to the spindle, a second control arm pivotally mounted to the chassis for pivotal movement about a second pivot axis and having a second connection to the spindle spaced from the first connection, the pivot axis of each control arm and the connection of that control arm to the spindle defining a control arm plane, said control arm planes intersecting to define a control line that intersects a vertical plane containing said longitudinal axis.

2. The snowmobile of claim 1 wherein said control arms for each ski continuously control the orientation of the steering spindle to define a steering axis for that ski, said control arms being configured to increase caster of the steering axis as the suspension for that ski is compressed.

3. The snowmobile of claim 1 wherein said control line for each ski intersects said vertical plane rearwardly of the steering spindle of that ski.

4. The snowmobile of claim 1 wherein said control line for each ski intersects said vertical plane forwardly of the steering spindle of that ski.

5. The snowmobile of claim 1 wherein said pivot axes are substantially parallel when viewed from the side but are substantially non-parallel when viewed from the top of the snowmobile.

6. The snowmobile of claim 1 wherein said pivot axes are substantially parallel when viewed from the top but are substantially non-parallel when viewed from the side of the snowmobile.

7. The snowmobile of claim 1 wherein said pivot axes are substantially non-parallel when viewed either from the side or from the top of the snowmobile.

8. The snowmobile of claim 2 wherein said snowmobile has a resting center of gravity and wherein said first and second pivot axes appear to intersect, as viewed from the side and at rest, at a point, relative to ground level, of ±1.2 times the height of said center of gravity.

9. The snowmobile of claim 8 wherein said snowmobile has a resting center of gravity and wherein said first and second pivot axes appear to intersect, as viewed from the side and at rest, at a point not lower than the ground upon which the snowmobile rests and not higher than about 1.2 times the height of said center of gravity.

10. The snowmobile of claim 8 wherein said first and second pivot axes appear to intersect, as viewed from the side and at rest, at a point spaced rearwardly from the ski pivot by a distance not exceeding about four snowmobile lengths.

11. The snowmobile of claim 2 wherein said control arms are so oriented with respect to the chassis and steering spindle that when said suspension is compressed from partial toward full compression, the camber angle of the ski is moved in the negative direction.

12. The snowmobile of claim 1 wherein said control arms are vertically separated upper and lower control arms and wherein the lower control arm is generally A-shaped with its ends having pivotal connections to the chassis to define said second pivot axis.

13. The snowmobile of claim 12 including a shock absorber for each ski, each shock absorber being attached at a lower end to the lower control arm spaced from the chassis and at an upper end to the chassis and oriented to enable the motion ratio of the suspension to increase as the suspension is compressed.

14. The snowmobile of claim 13 wherein the motion ratio increases from a value in the range of 0.4–0.7 to a value in the range of 0.5–0.8 as said suspension is compressed from a rest condition to a fully compressed condition.

15. The snowmobile of claim 12 wherein the upper control arm is generally A-shaped with its ends pivotally attached to the chassis to define said first pivot axis.

16. The snowmobile of claim 1 wherein the upper control arm includes a link operatively attached at one end to said spindle and at its other end pivotally to the chassis to define said first pivot axis.

17. The snowmobile of claim 1 wherein said first and second pivot axes, when viewed from the top, extend rearwardly and outwardly from said vertical plane.

18. The snowmobile of claim 1 wherein said first and second pivot axes, when viewed from the side and at rest, each extend rearwardly and downwardly.

19. The snowmobile of claim 9 wherein, as said suspension is compressed, said point where said pivot axes appear to intersect is positioned to restrain diving of the forward end of the snowmobile.

20. A snowmobile having a longitudinal axis and a chassis, a pair of skis each having a steering spindle defining a steering axis, and a suspension system joining each steering spindle to the chassis, the suspension system comprising, for each ski, a first control arm pivotally mounted to the chassis for pivotal movement about a first pivot axis and a second control arm spaced from the first control arm and pivotally mounted to the chassis for pivotal movement about a second pivot axis, said control arms extending operatively between the chassis and the steering spindle to continuously define the steering axis as the suspension system is compressed, each of said control arm pivot axes defining, with the associated connection to the steering spindle, a control arm plane, said control arm planes intersecting to define a control line that intersects a vertical plane containing said longitudinal axis, the control arms of each ski suspension being so oriented as to cause the camber angle of the ski to move in the negative direction as that suspension is compressed from partial compression toward its fully compressed condition.

21. The snowmobile of claim 20 wherein said snowmobile has a resting center of gravity and wherein said first and second pivot axes appear to intersect, as viewed from the side and at rest, at a point, relative to ground level, of ±1.2 times the height of said center of gravity.

22. The snowmobile of claim 21 wherein said snowmobile has a resting center of gravity and wherein said first and second pivot axes appear to intersect, as viewed from the side and at rest, at a point not lower than the ground upon which the snowmobile rests and not higher than about 1.2 times the height of said center of gravity.

23. The snowmobile of claim 21 wherein said first and second pivot axes appear to intersect, as viewed from the side and at rest, at a point spaced rearwardly from the ski pivot by a distance not exceeding about four snowmobile lengths.

24. The snowmobile of claim 20 wherein said control arms are vertically separated upper and lower control arms and wherein the lower control arm is generally A-shaped with its ends having pivotal connections to the chassis to define said second pivot axis.

25. The snowmobile of claim 24 including a shock absorber for each ski, each shock absorber being attached at a lower end to the lower control arm spaced from the chassis, and at an upper end to the chassis and oriented to enable the motion ratio of the suspension to increase as the suspension is compressed.

26. The snowmobile of claim 25 wherein the motion ratio increases from a value in the range of 0.4–0.7 to a value in the range of 0.5–0.8 as said suspension is compressed.

27. The snowmobile of claim 20 wherein, as each suspension is compressed, said intersection point of said control line with said vertical plane moves downwardly to increase the caster angle of the steering spindle.

28. The snowmobile of claim 23 wherein, as said suspension is compressed, said point where said pivot axes appear to intersect is positioned to restrain diving of the forward end of the snowmobile.

29. A snowmobile having a longitudinal axis and a chassis, a pair of skis each having a steering spindle defining a steering axis, and a suspension system joining the steering spindle to the chassis, the suspension system comprising, for each ski, an upper A-shaped control arm pivotally mounted to the chassis for pivotal movement about a first pivot axis and a lower A-shaped control arm spaced beneath the first control arm and pivotally mounted to the chassis for pivotal movement about a second axis, said control arms extending operatively between the chassis and the steering spindle to continuously define the steering axis as the suspension system is compressed, the control arms, at rest, defining first and second planes that intersect rearwardly to define a control line that itself intersects a vertical plane containing the longitudinal axis of the snowmobile, said A-shaped control arms being so oriented with respect to the chassis and steering spindle as to cause the caster angle to increase and the camber angle of the ski to move in the negative direction as the suspension is compressed from a partially compressed condition toward a fully compressed condition.

30. The snowmobile of claim 29 wherein said snowmobile has a resting center of gravity and wherein the first and second pivot axes appear to intersect, as viewed from the side and at rest, at a point, relative to ground level, of ±1.2 times the height of said center of gravity.

31. The snowmobile of claim 29 wherein said snowmobile has a resting center of gravity and wherein the first and second pivot axes appear to intersect, as viewed from the side and at rest, at a point not lower than the ground upon which the snowmobile rests and not higher than about 1.2 times the height of said center of gravity.

32. The snowmobile of claim 29 including a shock absorber operatively connected between the chassis and the lower A shaped control arm and oriented such that as the suspension system is compressed, the motion ratio of movement along the axis of the shock absorber to vertical movement of the spindle increases to thereby increase ski rate as the suspension is compressed.

33. The snowmobile of claim 32 wherein said shock absorber is so positioned that when the front suspension is compressed from a rest position to a substantially fully compressed condition, the motion ratio increases from a value in the range of 0.4–0.7 to a value in the range of 0.5–0.8.

34. A snowmobile having a longitudinal axis and a chassis, a pair of skis each having a steering spindle defining a steering axis, and a suspension system joining each steering spindle to the chassis, the suspension system comprising, for each ski, a first control arm pivotally mounted to the chassis for pivotal movement about a first pivot axis, a second control arm spaced from the first control arm and pivotally mounted to the chassis for pivotal movement about a second pivot axis, said first and second pivot axes being fixed with respect to each other and with respect to the chassis, said control arms extending between the chassis and the steering spindle to continuously define the steering axis as the suspension system is compressed, said first and second pivot axes being non-parallel and said control arms being so attached to said steering spindle that when said suspension is compressed toward a fully compressed condition, the caster angle of the steering spindle is increased and the camber angle of the ski is moved in the negative direction.

35. The snowmobile of claim 34 wherein said snowmobile has a resting center of gravity and wherein said first and second pivot axes appear to intersect, as viewed from the side and at rest, at a point, relative to ground level, of ±1.2 times the height of said center of gravity.

36. The snowmobile of claim 34 wherein said snowmobile has a resting center of gravity and wherein said first and second pivot axes appear to intersect, as viewed from the side and at rest, at a point not lower than the ground upon which the snowmobile rests and not higher than about 1.2 times the height of said center of gravity.

37. The snowmobile of claim 36 wherein said first and second pivot axes appear to intersect, as viewed from the side and at rest, at a point spaced rearwardly from the ski pivot by a distance not exceeding about four snowmobile lengths.

38. The snowmobile of claim 34 wherein said control arms are vertically separated upper and lower control arms and wherein the lower control arm is generally A-shaped with its ends pivotally attached to the chassis to define said second pivot axis.

39. The snowmobile of claim 34 including a shock absorber for each ski, each shock absorber being attached at a lower end to the lower control arm spaced from the chassis, and at an upper end to the chassis and oriented to enable the motion ratio of the suspension to increase as the suspension is compressed.

40. The snowmobile of claim 39 wherein the motion ratio increases from a value in the range of 0.4–0.7 to a value in the range of 0.5–0.8 as said suspension is compressed.

41. The snowmobile of claim 34 wherein said first and second pivot axes, as viewed from the top, extend rearwardly and outwardly from a vertical plane that contains the longitudinal axis of the snowmobile.

42. Method of continuously controlling the caster angle of the steering spindle of a snowmobile ski as the ski suspension is compressed, comprising providing a ski suspension system joining each steering spindle to the chassis, the suspension system comprising, for each ski, a first control arm pivotally mounted to the chassis for pivotal movement about a first pivot axis and having a first connection to the spindle, a second control arm pivotally mounted to the chassis for pivotal movement about a second pivot axis and having a second connection to the spindle spaced from the first connection, the pivot axis of each control arm and the connection of that control arm to the spindle defining a control arm plane, said control arm planes intersecting to define a control line that intersects a vertical plane containing said longitudinal axis, the control arms for each ski being oriented to increase caster of the steering axis as the suspension for that ski is compressed.

43. The method of claim 42 including orienting said control arms such that as the suspension for a ski is compressed toward full compression, the camber angle for that ski is moved in the negative direction.

44. The method of claim 42 including mounting a shock absorber for each ski between a lower end of a lower control arm and the chassis, the shock absorber being so mounted as to enable the motion ratio of the suspension to increase as the suspension is compressed.

45. The method of claim 42 in which said first and second pivot axes appear to intersect, as viewed from the side and at rest, at a point not lower than the ground upon which the snowmobile rests and not higher than about 1.2 times the height of said center of gravity to restrain the snowmobile from diving.

* * * * *